(12) United States Patent
Lin et al.

(10) Patent No.: US 11,273,801 B2
(45) Date of Patent: Mar. 15, 2022

(54) CONTROL SYSTEM FOR AN AIR MAINTENANCE TIRE SYSTEM

(71) Applicant: The Goodyear Tire & Rubber Company, Akron, OH (US)

(72) Inventors: Cheng-Hsiung Lin, Hudson, OH (US); James Andrews Euchner, North Salem, NY (US)

(73) Assignee: The Goodyear Tire & Rubber Company, Akron, OH (US)

(*) Notice: Subject to any disclaimer, the term of this patent is extended or adjusted under 35 U.S.C. 154(b) by 342 days.

(21) Appl. No.: 16/553,507

(22) Filed: Aug. 28, 2019

(65) Prior Publication Data
US 2020/0189533 A1 Jun. 18, 2020

Related U.S. Application Data

(60) Provisional application No. 62/781,222, filed on Dec. 18, 2018.

(51) Int. Cl.
*B60S 5/04* (2006.01)
*B60C 23/00* (2006.01)
(Continued)

(52) U.S. Cl.
CPC ............ *B60S 5/046* (2013.01); *B60C 23/001* (2013.01); *B60C 23/0447* (2013.01); *B60C 23/0476* (2013.01); *B60C 23/10* (2013.01)

(58) Field of Classification Search
CPC ..... B60S 5/046; B60C 23/0476; B60C 23/10; B60C 23/0447; B60C 23/001; B60C 23/0408
(Continued)

(56) References Cited

U.S. PATENT DOCUMENTS 5,558,730 A * 9/1996 Olney .................. B60C 23/004
152/418
6,658,928 B1  12/2003 Pollack et al.
(Continued)

FOREIGN PATENT DOCUMENTS

EP         3335913 A1    6/2018
GB         2539240 A    12/2016
WO    WO2011057591 A3    7/2011

OTHER PUBLICATIONS

EPO search report received by Applicant dated May 4, 2020.

*Primary Examiner* — Eric Blount
(74) *Attorney, Agent, or Firm* — Edward T. Kennedy

(57) ABSTRACT

A control system for an air maintenance tire system is provided. The control system includes a sensor unit that in turn includes a pressure sensor for measuring a pressure in the tire cavity and an antenna for transmitting pressure data. A processor receives the pressure data and includes a memory for storing a predetermined low-pressure threshold. Actuation means that are in communication with the processor and actuate and de-actuate operation of the air maintenance tire system. A first signal is transmitted from the processor to the actuation means to actuate operation of the air maintenance tire system when the measured pressure in the tire cavity is below the threshold. A second signal is transmitted from the processor to the actuation means to de-actuate operation of the air maintenance tire system when the measured pressure in the tire cavity is at or above the threshold.

16 Claims, 6 Drawing Sheets

(51) Int. Cl.
  *B60C 23/10* (2006.01)
  *B60C 23/04* (2006.01)
(58) Field of Classification Search
  USPC ........................................................ 152/419
  See application file for complete search history.

(56) References Cited

U.S. PATENT DOCUMENTS

| | | | |
|---|---|---|---|
| 6,868,358 B2 | 3/2005 | Brown, Jr. | |
| 6,880,598 B2* | 4/2005 | Haunhorst | B60C 23/00354 |
| | | | 152/415 |
| 7,104,438 B2 | 9/2006 | Benedict | |
| 7,237,590 B2* | 7/2007 | Loewe | B60C 23/043 |
| | | | 152/419 |
| 7,478,554 B2 | 1/2009 | Roth et al. | |
| 7,528,705 B2 | 5/2009 | Brown, Jr. et al. | |
| 7,549,330 B2 | 6/2009 | Crano et al. | |
| 7,642,904 B2 | 1/2010 | Crano | |
| 7,784,513 B2* | 8/2010 | Loewe | B60C 23/004 |
| | | | 152/419 |
| 9,114,673 B2 | 8/2015 | Gobinath | |
| 9,216,619 B2 | 12/2015 | Lin | |
| 9,327,562 B2 | 5/2016 | Lin | |
| 9,533,534 B2 | 1/2017 | Lamgaday | |
| 9,809,066 B2 | 11/2017 | Lin | |
| 10,315,470 B2 | 6/2019 | Lamgaday et al. | |
| 10,358,005 B2* | 7/2019 | McClellan | B60C 23/0408 |
| 10,399,392 B2* | 9/2019 | King | B60C 23/0408 |
| 10,576,795 B2* | 3/2020 | Ciovnicu | B60C 23/00372 |
| 2004/0007302 A1* | 1/2004 | Hamilton | B60C 23/041 |
| | | | 152/416 |
| 2010/0078109 A1* | 4/2010 | Wilson | B60C 23/00354 |
| | | | 152/416 |
| 2010/0282388 A1* | 11/2010 | Kelly | B60C 23/133 |
| | | | 152/419 |
| 2012/0232753 A1* | 9/2012 | Lhuillier | B60C 23/0479 |
| | | | 701/36 |
| 2012/0285596 A1* | 11/2012 | Hrabal | B60C 23/126 |
| | | | 152/450 |
| 2017/0015158 A1* | 1/2017 | McClellan | B60C 23/0408 |
| 2017/0253092 A9 | 9/2017 | Lin | |
| 2018/0086160 A1 | 3/2018 | Lin et al. | |
| 2018/0086161 A1 | 3/2018 | Lin | |
| 2018/0178599 A1 | 6/2018 | Lin et al. | |
| 2018/0178600 A1 | 6/2018 | Lin et al. | |
| 2018/0319228 A1 | 11/2018 | Durr et al. | |
| 2018/0356798 A1* | 12/2018 | Ciovnicu | B60C 23/00354 |
| 2019/0001767 A1 | 1/2019 | Taggart et al. | |
| 2019/0047334 A1* | 2/2019 | Chidlow | B60C 23/002 |
| 2019/0184771 A1 | 6/2019 | Pulford et al. | |

\* cited by examiner

CONTROL SYSTEM FOR AN AIR MAINTENANCE TIRE SYSTEM

FIELD OF THE INVENTION

The invention relates to air maintenance tire systems, which are systems that maintain appropriate air pressure within a pneumatic tire. More particularly, the invention relates to control of air maintenance tire systems. The invention is directed to a control system for an air maintenance tire system that enables accurate and economical control of the actuation of the air maintenance tire system.

BACKGROUND OF THE INVENTION

Conventional pneumatic tires are designed to perform for relatively long periods of time. In many cases, automobile tires are now expected to have a useful service life of 30,000, 50,000 or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires may repeatedly become underinflated. Accordingly, drivers must in turn repeatedly act to maintain recommended air pressures in the vehicle tires to avoid reduced fuel economy, tire life, and/or vehicle braking and handling performance. Tire pressure monitoring systems (TPMS) are automated systems that have been implemented in some vehicles to warn drivers when the air pressure in the tires is significantly low. Such systems, however, remain dependent upon a driver taking remedial action, when warned, to re-inflate a tire to the recommended pressure. It had thus been desirable in the prior art to incorporate an air maintenance feature within a pneumatic tire that would maintain a predetermined or recommended air pressure without requiring driver intervention.

To this end, air maintenance tire (AMT) systems have been developed. An AMT system typically includes one or more pumps or pumping assemblies that act to increase the air pressure in the vehicle tires as needed. In such AMT systems, a pumping mechanism is in fluid communication with the tire cavity. The pumping mechanism compresses air from atmosphere, which is then directed into the tire cavity.

While AMT systems are suitable for their intended purpose, many such systems rely upon mechanically or pneumatically actuated valves. Valves with such actuation are often complex and thus may be expensive. In addition, mechanically or pneumatically actuated valves may not account for temperature or other conditions in the tire and may not be as precise in their actuation as desired.

As a result, it is desirable to develop a control system for an air maintenance tire system that enables accurate and economical control of the actuation of the air maintenance tire system.

SUMMARY OF THE INVENTION

According to an aspect of an exemplary embodiment of the invention, a control system for an air maintenance tire system is provided. The air maintenance tire system includes at least one pump in fluid communication with a tire cavity. The tire cavity is formed by a pneumatic tire being mounted on a wheel. The at least one pump compresses the air from atmosphere and releases the compressed air into the tire cavity upon operation of the air maintenance tire system. The control system includes a sensor unit, in which the sensor unit includes a pressure sensor for measuring a pressure in the tire cavity and an antenna for transmitting measured pressure data. A processor receives the measured pressure data and includes a memory for storing a predetermined low-pressure threshold. Actuation means are in communication with the processor and actuate and de-actuate operation of the air maintenance tire system. A first signal is transmitted from the processor to the actuation means to actuate operation of the air maintenance tire system when the measured pressure in the tire cavity is below the threshold. A second signal is transmitted from the processor to the actuation means to de-actuate operation of the air maintenance tire system when the measured pressure in the tire cavity is at or above the threshold.

BRIEF DESCRIPTION OF THE DRAWINGS

The invention will be described by way of example and with reference to the accompanying drawings, in which.

Similar numerals refer to similar parts throughout the drawings.

Definitions

"Affixed" means attached to a tire or joined to a tire by any means known to those skilled in the art, including adhesion, mechanical structures, integral forming in the tire, and the like.

"Axial" and "axially" means lines or directions that are parallel to the axis of rotation of the tire.

"Axially inwardly" means an axial direction that is toward the center plane of the tire.

"Axially outwardly" means an axial direction that is away from the center plane of the tire.

"Bead" means the part of a tire comprising an annular tensile member wrapped by ply cords and shaped, with or without other reinforcement elements, to fit the wheel.

"Carcass" means the tire structure apart from the belt structure, tread, under tread, and sidewall rubber over the plies, but including the beads.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length.

"Inboard side" means the side of the tire nearest the vehicle when the tire is mounted on a wheel and the wheel is mounted on the vehicle.

"Inboard" or "inboardly" means an axial direction corresponding to the inboard side of the tire.

"Innerliner" means the layer or layers of elastomer or other material that form the inside surface of a tubeless tire and that contain the inflating fluid within the tire.

"Lateral" means an axial direction.

"Outboard side" means the side of the tire farthest away from the vehicle when the tire is mounted on a wheel and the wheel is mounted on the vehicle.

"Outboard" or "outboardly" means an axial direction corresponding to the outboard side of the tire.

"Radial" and "radially" means directions radially toward or away from the axis of rotation of the tire.

"Radially inwardly" means a radial direction that is toward the central axis of rotation of the tire.

"Radially outwardly" means a radial direction that is away from the central axis of rotation of the tire.

"Tread element" or "traction element" means a rib or a block element defined by a shape having adjacent grooves.

DETAILED DESCRIPTION OF THE INVENTION

Figure 1:
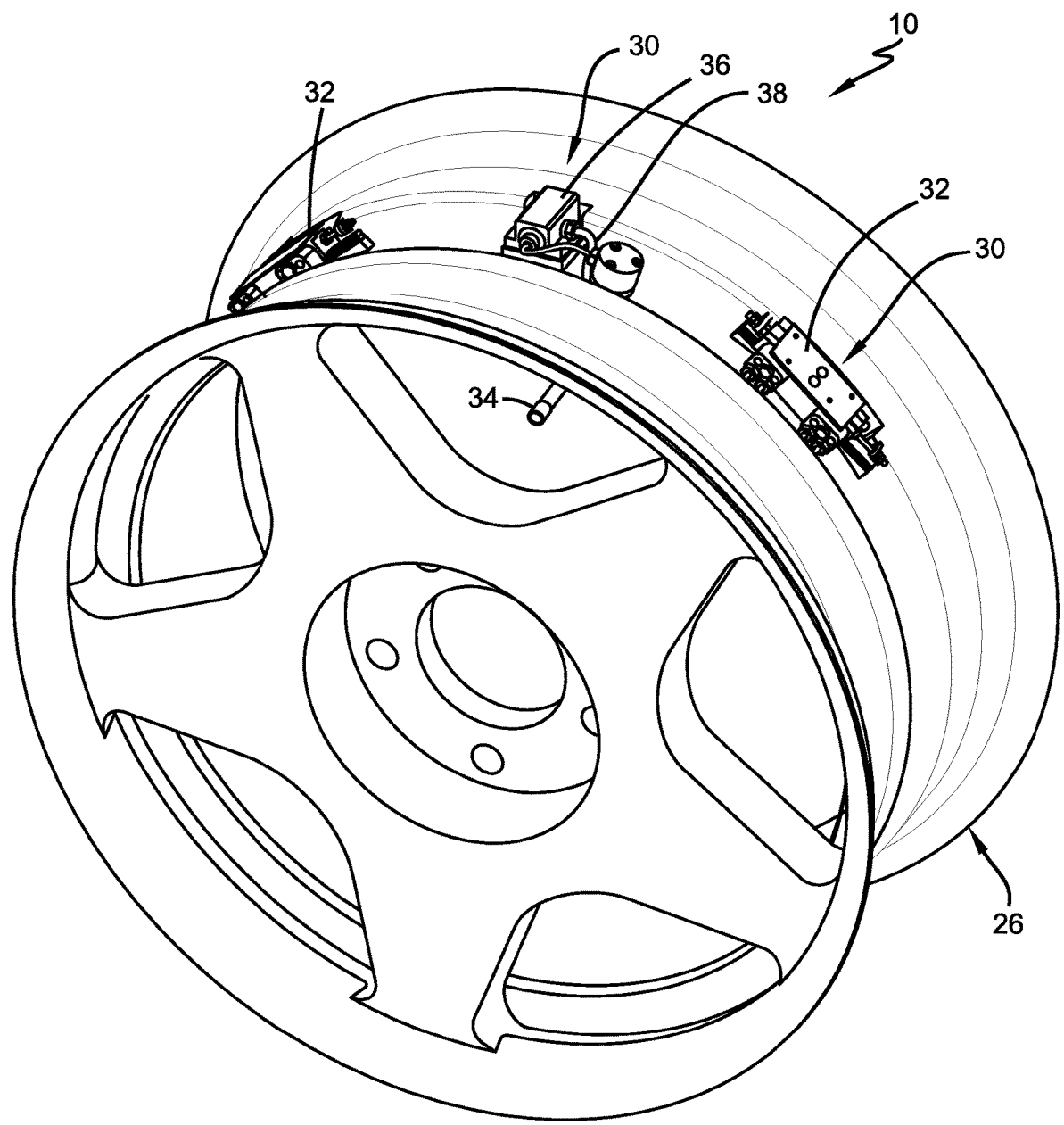
FIG. 1 is a perspective view of a wheel with an exemplary AMT system incorporating the control system of the present invention.
Figure 2:
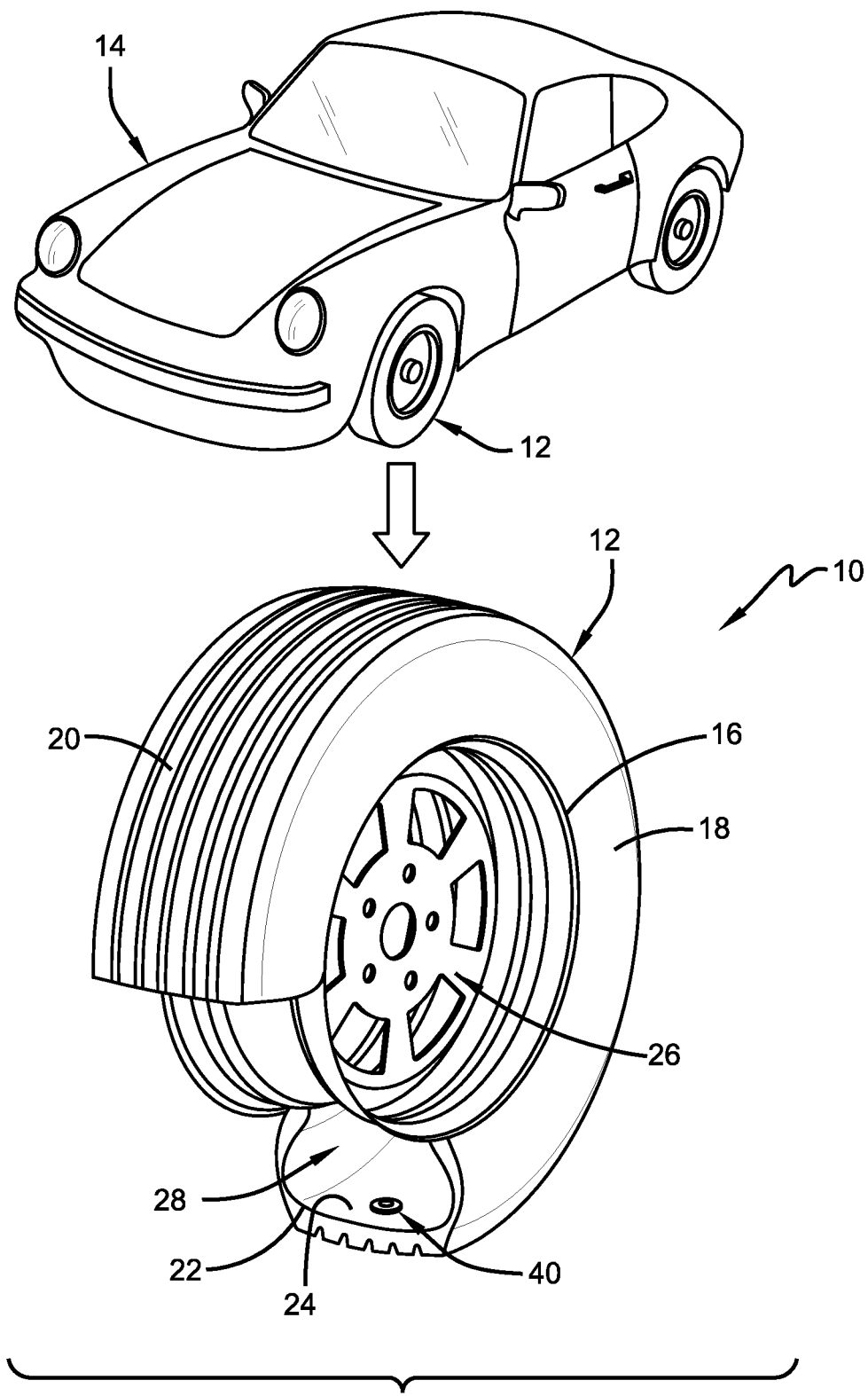
FIG. 2 is a schematic perspective view of a vehicle and tire employing an exemplary sensor unit of the control system for an AMT system of the present invention.

A first exemplary embodiment of a control system for an air maintenance tire (AMT) system of the present invention is indicated generally at 10 and is shown in FIGS. 1 through 4. Referring to FIG. 2, a tire 12 supports a vehicle 14. By way of example, the tire 12 includes a pair of bead areas 16 (only one shown) and a bead core (not shown) embedded in each bead area. Each one of a pair of sidewalls 18 (only one shown) extends radially outward from a respective bead area 16 to a ground-contacting tread 20. The tire 12 is reinforced by a carcass 22 that toroidally extends from one bead area 16 to the other bead area, as known to those skilled in the art. An innerliner 24 is formed on the inside surface of the carcass 22. The tire 12 is mounted on a wheel 26 in a manner known to those skilled in the art and, when mounted, forms an internal cavity 28 that is filled with a pressurized fluid, such as air.

Turning to FIG. 1, components of an exemplary AMT system 30 are also mounted on the wheel 26 and are disposed within the tire cavity 28 (FIG. 2). The AMT system 30 includes, by way of example, at least one pump 32. The pump 32 may be a mechanical pump, such as a linearly-actuating or shuttle pump, or an electrical pump, as will be described in greater detail below. For example, a shuttle pump 32 may be employed to harvest energy through back-and-forth motion as the wheel 26 rotates in order to power electronic components that will be described below. If more than one pump 32 is employed, the pumps may be pneumatically connected in series about the wheel 26 through a conduit or flexible line (not shown), or may be pneumatically independent of one another. For the purpose of convenience, the AMT system 30 will be described with one pump 32, with the understanding that such reference includes one or more pumps.

Air is introduced into the AMT system 30 through an inlet 34, which is shown by way of example as a valve stem. Other structures may be employed as the inlet 34, such as pneumatic ports and/or valves. The inlet 34 is pneumatically connected to an actuation valve 36, such as by a conduit or flexible line 38. The actuation valve 36 is connected to an inlet of the pump 32 to enable air flow to enter the pump from atmosphere. By way of example, air is drawn into the AMT system 30 through the inlet 34, communicated to the actuation valve 36, and to the pump 32, which compresses air from atmosphere. The compressed air is released into the cavity 28 to increase the pressure in the cavity.

It is to be understood that the invention is not limited to a specific structure or configuration of the pump 32, inlet 34, actuation valve 36 and other components of the AMT system 30. Examples of pump configurations and other system components are described in U.S. Pat. No. 9,327,562; U.S. Patent Publication No. 2015/0314657; U.S. Patent Application Ser. No. 62/398,917; and U.S. Patent Application Ser. No. 62/398,981, all of which are owned by the same assignee as the present invention, The Goodyear Tire & Rubber Company, and all of which are incorporated herein by reference.

Returning to FIG. 2, the control system for an AMT system 10 includes a sensor unit 40 that preferably is attached or mounted in or on the 12. The sensor unit 40 measures certain parameters or conditions of the tire 12, as will be described in greater detail below, and may be attached to the innerliner 24 by means such as an adhesive. It is to be understood that the sensor unit 40 may be attached in such a manner, or to other components of the tire 12, such as between layers of the carcass 22, on or in one of the sidewalls 18, on or in the tread 20, and/or a combination thereof. The sensor unit 40 may also be attached to or integrated with the wheel 26 or a component of the AMT system 30. For the purpose of convenience, reference herein shall be made to mounting of the sensor unit 40 on the tire 12, with the understanding that such mounting includes all such attachment and/or integration.

It is to be understood that the sensor unit 40 shown in FIG. 2 is by way of example, and that the sensor may be of any size and/or shape. For example, the sensor unit 40 may be a disc-shaped unit as shown, or may be a particulate-inclusion type of unit as described in greater detail in U.S. Patent Publication No. 2019/0184771, which is owned by the same Assignee as the instant Application, The Goodyear Tire & Rubber Company, and which is incorporated herein by reference.

Figure 3:
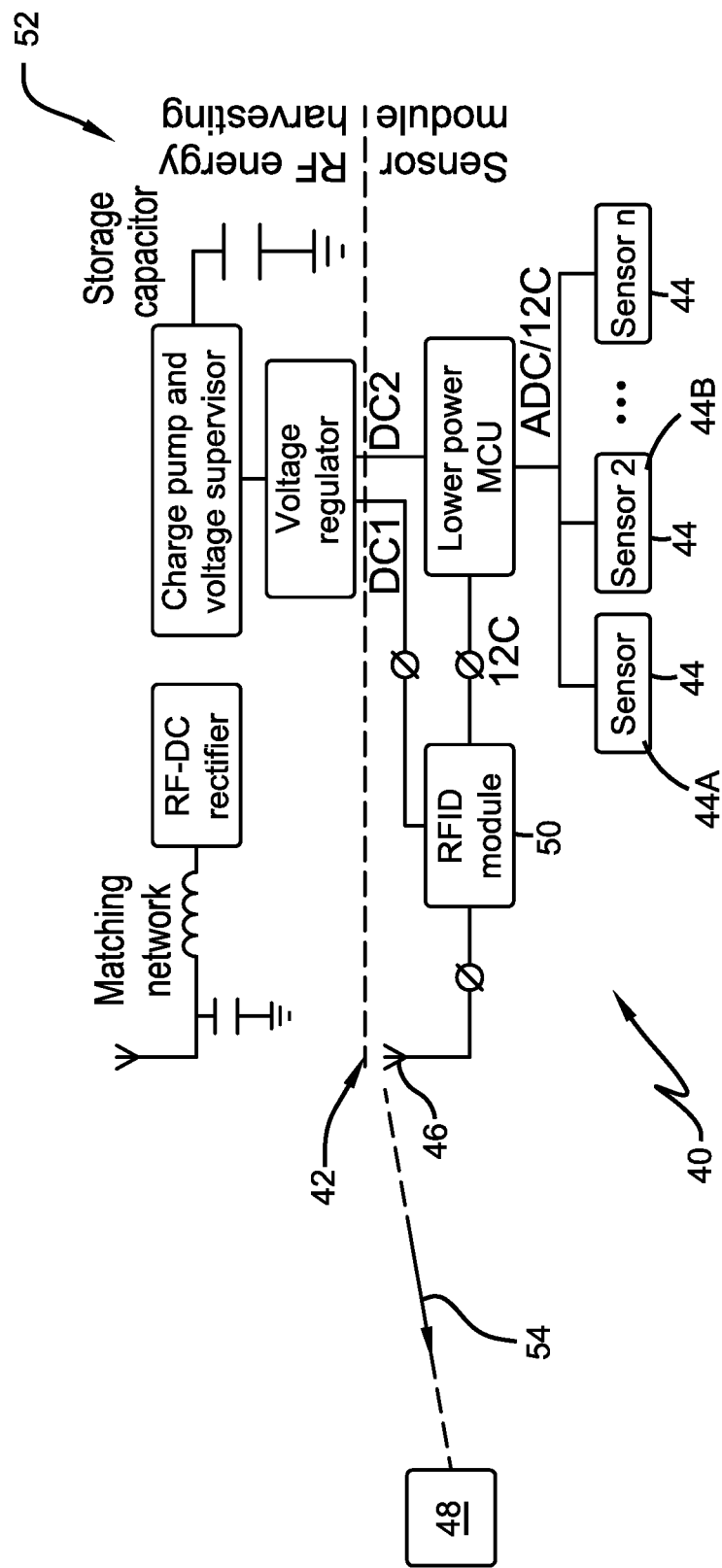
FIG. 3 is a circuit diagram of the sensor unit shown in FIG. 2.

Turning now to FIG. 3, the sensor unit 40 preferably includes an integrated circuit 42 that processes and stores information. The sensor unit 40 also includes at least one sensor 44 that is electronically connected to the integrated circuit 42 and may be integrated into the integrated circuit. Of course, multiple sensors 44 may be electronically connected to the integrated circuit 42 and may be integrated into the integrated circuit. For example, the sensors 44 may include a pressure sensor 44A and a temperature sensor 44B, as will be described in greater detail below. The sensor unit 40 preferably includes an antenna 46 for receiving and transmitting a signal 54 to a processor 48, which will also be described in greater detail below. The antenna 46 is also electronically connected to the integrated circuit 42 and may be carried on a substrate with the integrated circuit.

The sensor unit 40 optionally includes a module 50 for storing identification (ID) information for the tire 12. The tire ID information may include manufacturing information for the tire 12, such as: the tire type; tire model; size information, such as rim size, width, and outer diameter; manufacturing location; manufacturing date; a tread cap code that includes or correlates to a compound identification; and a mold code that includes or correlates to a tread structure identification. The tire ID information may also include a service history or other information to identify specific features and parameters of each tire 12, as well as mechanical characteristics of the tire, such as cornering parameters, spring rate, load-inflation relationship, and the like. Such tire identification enables correlation of the parameters measured by the sensors 44 of the sensor unit 40 with the specific tire 12 to provide local or central tracking of the tire, its current condition, and/or its condition over time.

The sensor unit 40 may be configured to receive a radio frequency (RF) power signal and/or to transmit an RF data signal using the antenna 46 and the integrated circuit 42. In this manner, the sensor unit 40 transmits data measured by the sensors 44, as well as optional tire ID information from the module 50, to the processor 48. For power, the sensor unit 40 preferably includes power means 52 integrated with or in electronic communication with the integrated circuit 42. The power means 52 include a wireless power receiver, a non-rechargeable battery, rechargeable battery, supercapacitor and/or energy harvesting structure. As mentioned above, a shuttle pump 32 may be employed to harvest energy and thus act as the power means 52.

Preferably, the sensor unit 40 is a tire pressure monitoring system (TPMS) sensor unit. Such a TPMS sensor unit 40 includes the pressure sensor 44A, which measures the pressure in the cavity 28 of the tire 12 during its use on the vehicle 14. The TPMS sensor unit 40 also includes the temperature sensor 44B, which measures the temperature within the tire 12 during its use on the vehicle 18. The TPMS sensor unit 40 may correlate the pressure and temperature measurements.

Figure 4:
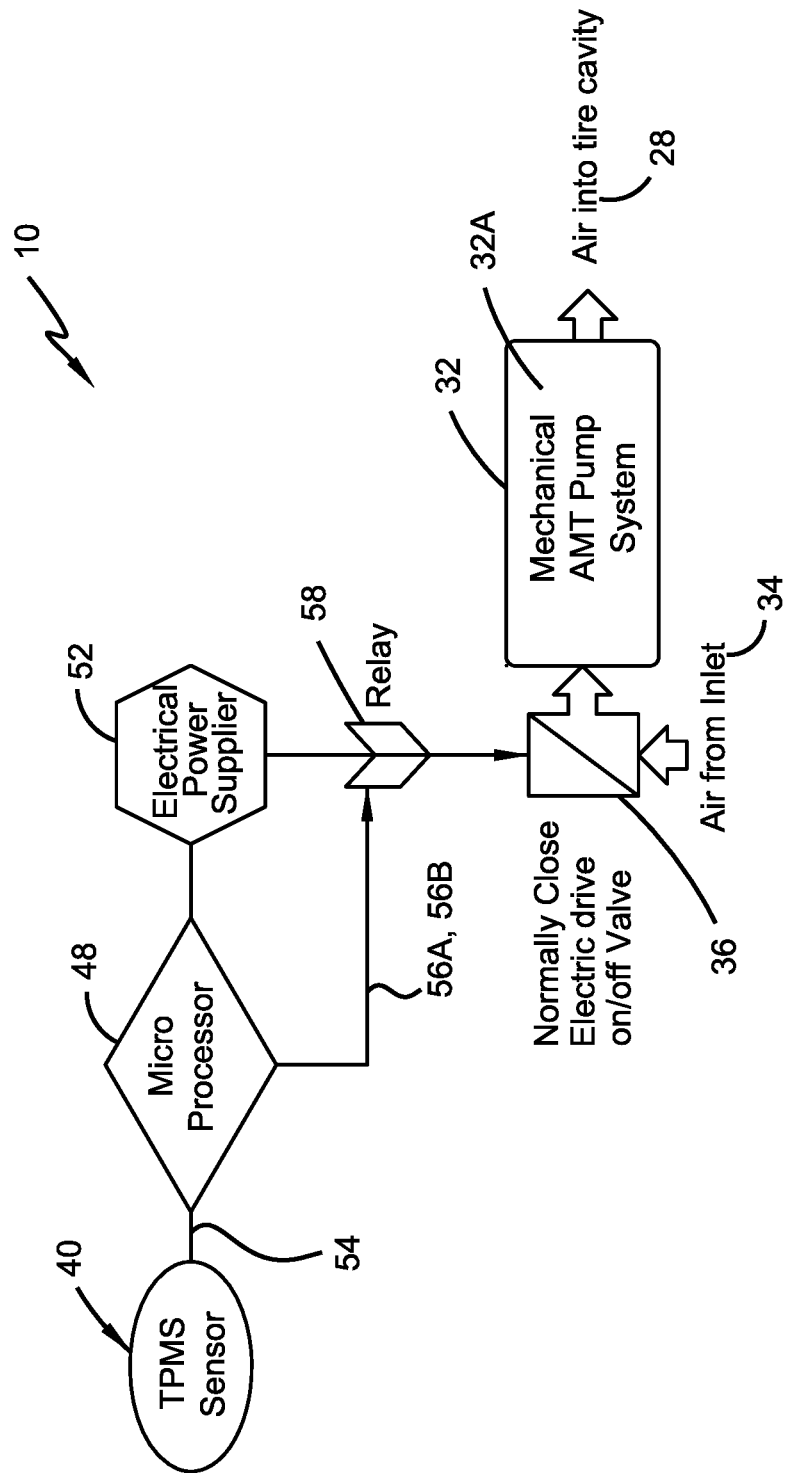
FIG. 4 is a schematic representation of a configuration of a first exemplary embodiment of the control system for an AMT system of the present invention.

Referring now to FIG. 4, the first embodiment of the control system for an AMT system 10 includes inlet control. More particularly, as described above, the sensor unit 40 transmits a signal 54 to the processor 48. The processor 48 may be integrated with the sensor unit 40 and thus powered by the same power means 52 that provide power to the sensor unit, or the processor may be a separate unit that is separately powered. The signal 54 includes data with a measurement by the sensor unit 40 of pressure within the tire cavity 28 (FIG. 2), which may also take the temperature of the tire 12 into account. The processor 48 includes a memory that stores a predetermined low-pressure threshold and is capable of comparing the measured pressure data to the threshold.

When the measured pressure in the cavity 28 is below the threshold, the processor 48 sends a first signal 56A to an electronic relay 58 that is in electrical communication with the actuation valve 36. As the first embodiment of the air maintenance tire control system 10 includes inlet control, the first signal 56A opens the actuation valve 36, which is in communication with an inlet of the pump 32, thereby enabling air to flow from the inlet 34 into the pump. In the first embodiment of the control system 10, the pump 32 preferably is a mechanical pump 32A, such as a linearly-actuating or shuttle pump, which continuously operates as the wheel 26 rotates. When air flows into the pump 32A, the air is compressed and released into the tire cavity 28. The power means 52 may also power the relay 58 and/or the actuation valve 36.

As the sensor unit 40 continues to transmit signals 54 to the processor 48, the processor monitors the measured pressure in the cavity 28. When the measured pressure in the cavity 28 is at or above the threshold, the processor 48 sends a second signal 56B to the electronic relay 58 and thus the actuation valve 36. The second signal 56B closes the actuation valve 36, stopping air from flowing past the inlet 34 into the pump 32A, so that no air is compressed and released into the tire cavity 28.

In this manner, when the measured pressure in the tire cavity 28 as detected by the sensor unit 40 is below the threshold, the processor 48 sends the first signal 56A to actuation means, which actuate operation of the air maintenance tire system 30. When the measured pressure in the tire cavity 28 as detected by the sensor unit 40 is at or above the threshold, the processor 48 sends the second signal 56B to the actuation means to de-actuate operation of the air maintenance tire system 30. In the first embodiment of the control system 10, the actuation means include the inlet actuation valve 36.

Figure 5:
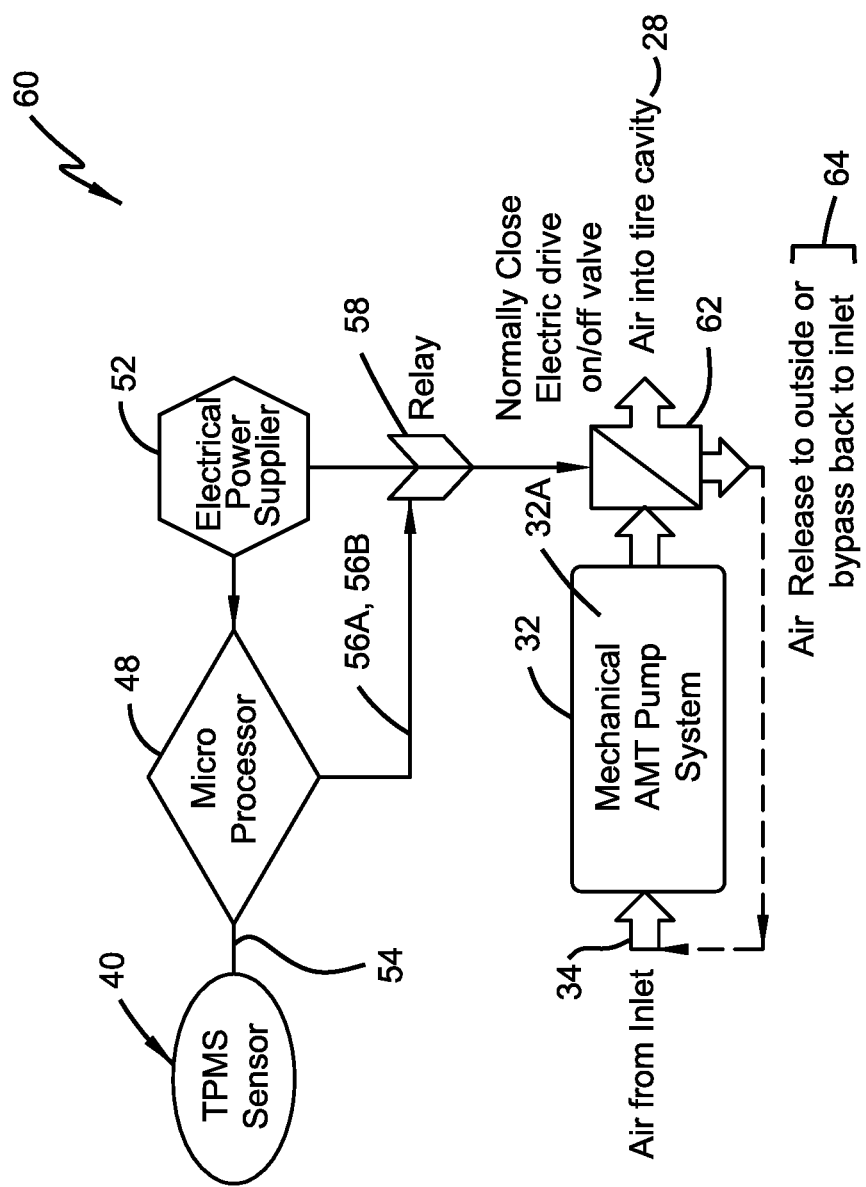
FIG. 5 is a schematic representation of a configuration of a second exemplary embodiment of the control system for an AMT system of the present invention.

Turning now to FIG. 5, a second exemplary embodiment of a control system for an AMT system of the present invention is indicated generally at 60. The second embodiment of the control system for the AMT system 60 is similar in structure and function to the first embodiment of the control system 10, with the exception that the second embodiment of the control system includes outlet control.

More particularly, as described above, the sensor unit 40 transmits a signal 54 to the processor 48. The processor 48 may be integrated with the sensor unit 40 and thus powered by the same power means 52 that provide power to the sensor unit, or the processor may be a separate unit that is separately powered. The signal 54 includes data with a measurement by the sensor unit 40 of pressure within the tire cavity 28, which may also take the temperature of the tire 12 into account. The processor 48 includes a memory that stores the predetermined low-pressure threshold and is capable of comparing the measured pressure data to the threshold.

When the measured pressure in the cavity 28 is below the threshold, the processor 48 sends a first signal 56A to an electronic relay 58 that is in electrical communication with an actuation valve 62, which is in communication with an outlet of the pump 32. In the second embodiment of the control system 60, the pump 32 preferably is a mechanical pump 32A, such as a linearly-actuating or shuttle pump, which continuously operates as the wheel 26 rotates. The second embodiment of the control system 60 includes outlet control, so air continuously flows into the pump 32A through the inlet 34. The first signal 56A opens the actuation valve 62, enabling air to flow from the pump 32A into the tire cavity 28. The power means 52 may also power the relay 58 and/or the actuation valve 62.

As the sensor unit 40 continues to transmit signals 54 to the processor 48, the processor monitors the measured pressure in the cavity 28. When the measured pressure in the cavity 28 is at or above the threshold, the processor 48 sends a second signal 56B to the electronic relay 58 and thus the actuation valve 62. The second signal 56B closes the actuation valve 62, stopping air from flowing out of the pump 32A into the tire cavity 28. Because the pump 32A continuously operates as the wheel 26 rotates, and air continuously flows into the pump through the inlet 34, the second signal 56B also actuates a bypass 64 in the actuation valve 62. The bypass 64 diverts or routes compressed air from the pump 32A to atmosphere or back to the inlet 34.

In this manner, when the measured pressure in the tire cavity 28 as detected by the sensor unit 40 is below the threshold, the processor 48 sends the first signal 56A to actuation means, which actuate operation of the air maintenance tire system 30. When the measured pressure in the tire cavity 28 as detected by the sensor unit 40 is at or above the threshold, the processor 48 sends the second signal 56B to the actuation means to de-actuate operation of the air maintenance tire system 30. In the second embodiment of the control system 60, the actuation means include the outlet actuation valve 62.

Figure 6:
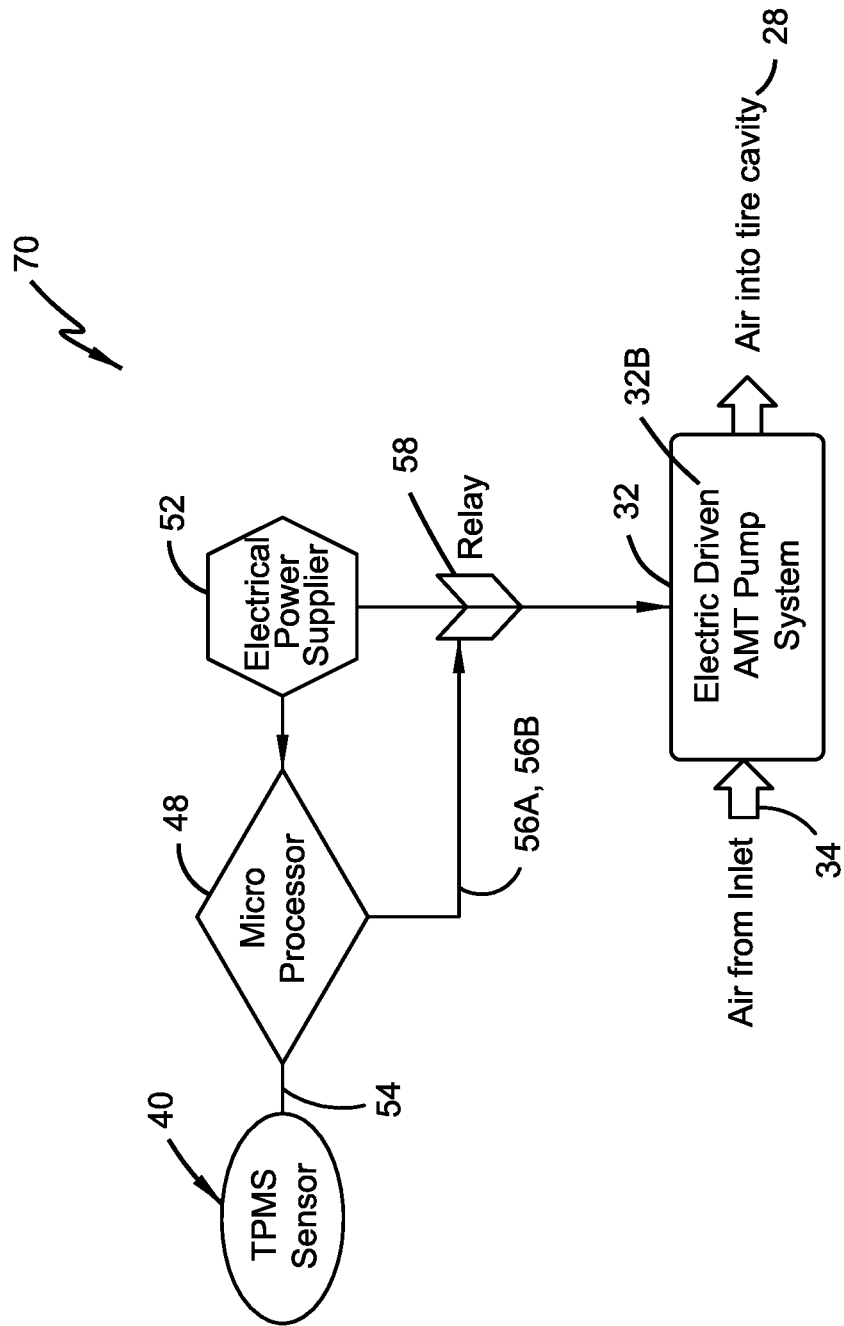
FIG. 6 is a schematic representation of a configuration of a third exemplary embodiment of the control system for an AMT system of the present invention.

With reference to FIG. 6, a third exemplary embodiment of a control system for an AMT system of the present invention is indicated generally at 70. The third embodiment of the control system 70 is similar in structure and function to the first embodiment of the control system 10 and the second embodiment of the control system 60, with the exception that the third embodiment of the system includes an electrical pump.

More particularly, as described above, the sensor unit 40 transmits a signal 54 to the processor 48. The processor 48 may be integrated with the sensor unit 40 and thus powered by the same power means 52 that provide power to the sensor unit, or the processor may be a separate unit that is separately powered. The signal 54 includes data with a measurement by the sensor unit 40 of pressure within the tire cavity 28, which may also take the temperature of the tire 12 into account. The processor 48 includes a memory that stores a predetermined low-pressure threshold and is capable of comparing the measured pressure data to the threshold.

When the measured pressure in the cavity 28 is below the threshold, the processor 48 sends a first signal 56A to an electronic relay 58 that is in electrical communication with the pump 32. As mentioned above, the pump 32 is an electrical pump 32B, which includes on/off control that is actuated or turned on upon receipt of the first signal 56A. Upon actuation by the first signal 56A, the electrical pump 32B compresses air which flows in from the inlet 34 and releases the compressed air into the tire cavity 28. The power means 52 may also power the relay 58 and/or the electrical pump 32B.

As the sensor unit 40 continues to transmit signals 54 to the processor 48, the processor monitors the measured pressure in the cavity 28. When the measured pressure in the cavity 28 is at or above the threshold, the processor 48 sends a second signal 56B to the electronic relay 58 and thus on/off control of the electrical pump 32B. The second signal 56B de-actuates or shuts off the electrical pump 32B, so that no air is compressed and released into the tire cavity 28.

In this manner, when the measured pressure in the tire cavity 28 as detected by the sensor unit 40 is below the threshold, the processor 48 sends the first signal 56A to actuation means, which actuate operation of the air maintenance tire system 30. When the measured pressure in the tire cavity 28 as detected by the sensor unit 40 is at or above the threshold, the processor 48 sends the second signal 56B to the actuation means to de-actuate operation of the air maintenance tire system 30. In the third embodiment of the control system 70, the actuation means include electrical on/off control of the electrical pump 32B.

The control system for an AMT system 10, 60 and 70 thus provides accurate and economical control of the actuation of the AMT system 30. By incorporating a sensor unit 40, the control system 10, 60 and 70 employs fewer parts than systems of the prior art and utilizes an accurate pressure sensor to ensure optimum performance and efficiency of the AMT system. Utilizing the electronic sensing of the sensor unit 40 also enables the control system 10, 60 and 70 to provide a quick response of the AMT system 30 to pressure changes in the tire 12, as well as an accurate inflation level. In addition, such electronic sensing enables the control system 10, 60 and 70 to provide binary control, or true on/off, which prior art pneumatically or mechanically controlled systems have not been able to achieve.

Moreover, the control system 10, 60 and 70 enables the pressure measurement by the sensor unit 40 to take the temperature of the tire 12 into account as described above. In addition, the control system 10, 60 and 70 may also receive and take into account an atmospheric temperature. Because the processor 48 includes a memory that stores a predetermined low-pressure threshold, the threshold may be correlated or adjusted to account for various temperature effects. For example, the atmospheric temperature may be employed by the processor 48 to offset the measured temperature of the tire 12 and adjust the pressure settings and the pumping action of the AMT system 30 to account for true atmospheric temperature, seasonal temperature changes, and to account for local temperature and/or elevation considerations based on geographic regions. The control system 10, 60 and 70 thus further improves the accuracy and efficiency of the operation of the AMT system 30.

The present invention also includes a method of inflating a tire 12 using a control system for an AMT system 10, 60 and 70. The method includes steps in accordance with the description that is presented above and shown in FIGS. 1 through 6.

It is to be understood that the structure of the above-described control system for an AMT system 10, 60 and 70 may be altered or rearranged, or components or steps known to those skilled in the art omitted or added, without affecting the overall concept or operation of the invention. For example, the components of the AMT system 30 may be different from those described above, including any type of pumps, any number of pumps, any configurations, and/or any type of regulator known to those skilled in the art. In addition, the sensor unit 40 may be different than the unit described above, including any sensor unit configurations, number of sensor units and/or arrangements known to those skilled in the art.

Moreover, the control system 10, 60 and 70 may be employed on any type of pneumatic tire 12, including consumer, commercial, aircraft, off-the-road, and other tires. The AMT system 30 may also be mounted in the tire 12 as described above, which is known as an internally-mounted system, or mounted outside of the tire, which is known as an externally-mounted system, without affecting the overall concept or operation of the invention.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A control system for an air maintenance tire system, wherein the air maintenance tire system includes a plurality of pumps in fluid communication with a tire cavity, the tire cavity being formed by a pneumatic tire being mounted on a wheel, the plurality of pumps being pneumatically connected in series about the wheel and compressing the air from atmosphere and releasing the compressed air into the tire cavity upon operation of the air maintenance tire system, the control system comprising:
   a sensor unit including a pressure sensor for measuring a pressure in the tire cavity and an antenna for transmitting measured pressure data;
   a processor for receiving the measured pressure data, the processor including a memory for storing a predetermined low-pressure threshold;

actuation means in communication with the processor for actuating and de-actuating operation of the air maintenance tire system;

a first signal transmitted from the processor to the actuation means to actuate operation of the air maintenance tire system when the measured pressure in the tire cavity is below the threshold; and a second signal transmitted from the processor to the actuation means to de-actuate operation of the air maintenance tire system when the measured pressure in the tire cavity is at or above the threshold.

2. The control system for an air maintenance tire system of claim 1, wherein the sensor unit is mounted on at least one of the tire, the wheel and the air maintenance tire system.

3. The control system for an air maintenance tire system of claim 1, wherein at least one pump in the plurality of pumps is a mechanical pump.

4. The control system for an air maintenance tire system of claim 3, wherein the actuation means includes an actuation valve in fluid communication with an inlet of at least one pump in the plurality of pumps, the first signal opening the actuation valve and the second signal closing the actuation valve.

5. The control system for an air maintenance tire system of claim 3, wherein the actuation means includes an actuation valve in fluid communication with an outlet of at least one pump in the plurality of pumps, the first signal opening the actuation valve and the second signal closing the actuation valve.

6. The control system for an air maintenance tire system of claim 5, wherein the second signal also actuates a bypass in the actuation valve.

7. The control system for an air maintenance tire system of claim 1, wherein at least one pump in the plurality of pumps is an electrical pump.

8. The control system for an air maintenance tire system of claim 7, wherein the actuation means includes electrical on/off control of the electrical pump.

9. The control system for an air maintenance tire system of claim 1, further comprising a relay in electronic communication with the processor and the actuation means.

10. The control system for an air maintenance tire system of claim 1, wherein the sensor unit further comprises a temperature sensor for measuring a temperature in the tire.

11. The control system for an air maintenance tire system of claim 10, wherein at least one of the sensor unit and the processor correlates the measured pressure and the measured temperature.

12. The control system for an air maintenance tire system of claim 10, wherein the sensor unit is a tire pressure monitoring system sensor unit.

13. The control system for an air maintenance tire system of claim 10, wherein the processor receives an atmospheric temperature reading and offsets the measured temperature of the tire with the atmospheric temperature reading.

14. The control system for an air maintenance tire system of claim 1, wherein the sensor unit includes a module for storing identification information for the tire.

15. The control system for an air maintenance tire system of claim 1, further comprising power means to power the sensor unit, the power means including at least one of a wireless power receiver, a non-rechargeable battery, a rechargeable battery, a supercapacitor and an energy harvesting structure.

16. The control system for an air maintenance tire system of claim 15, wherein the power means also power the actuation means.

* * * * *